United States Patent
Yamada

(10) Patent No.: US 11,735,754 B2
(45) Date of Patent: Aug. 22, 2023

(54) SEPARATION MEMBRANE FOR REDOX FLOW BATTERY, AND METHOD OF MANUFACTURING SAID SEPARATION MEMBRANE

(71) Applicants: NIDAIKI CO., LTD., Aichi (JP); Ohki Yamada, Aichi (JP)

(72) Inventor: Ohki Yamada, Aichi (JP)

(73) Assignees: NIDAIKI CO., LTD., Aichi (JP); Ohki Yamada, Aichi (JP)

( * ) Notice: Subject to any disclaimer, the term of this patent is extended or adjusted under 35 U.S.C. 154(b) by 0 days.

(21) Appl. No.: 17/704,408

(22) Filed: Mar. 25, 2022

(65) Prior Publication Data

US 2022/0246968 A1 Aug. 4, 2022

Related U.S. Application Data

(63) Continuation of application No. PCT/JP2020/025535, filed on Jun. 29, 2020.

(30) Foreign Application Priority Data

Sep. 27, 2019 (JP) ................................. 2019-176924

(51) Int. Cl.
*H01M 8/1088* (2016.01)
*H01M 8/1018* (2016.01)
*H01M 8/106* (2016.01)
*H01M 8/18* (2006.01)

(52) U.S. Cl.
CPC ......... *H01M 8/1088* (2013.01); *H01M 8/106* (2013.01); *H01M 8/1018* (2013.01); *H01M 8/188* (2013.01)

(58) Field of Classification Search
CPC .. H01M 8/1088; H01M 8/1018; H01M 8/106; H01M 8/188
See application file for complete search history.

(56) References Cited

U.S. PATENT DOCUMENTS

2018/0351192 A1  12/2018  Lee et al.

FOREIGN PATENT DOCUMENTS

| JP | 11-086909 A | 3/1999 |
| JP | 2000-235849 A | 8/2000 |
| JP | 2007-134147 A | 5/2007 |
| JP | 2012-248408 A | 12/2012 |
| JP | 2013-507742 A | 3/2013 |
| JP | 2013-521365 A | 6/2013 |
| JP | 2016-068105 A | 5/2016 |
| JP | 2017-090780 A | 5/2017 |
| JP | 2019-518588 A | 7/2019 |

OTHER PUBLICATIONS

International Search Report for PCT/JP2020/025535, dated Sep. 1, 2020, total p. 3.

*Primary Examiner* — James Lee
(74) *Attorney, Agent, or Firm* — Apex Juris, PLLC; Hilde Coeckx

(57) ABSTRACT

A separation membrane for a redox flow battery includes: a protective film formed on each of both surfaces of a sheet substrate along with pores, the sheet substrate having thereon a number of pores communicating between the both surfaces; and an ion-exchange membrane adhered to the protective film, the ion-exchange membrane having a matrix formed of an ion-exchange resin dispersed therein with an inorganic porous powdery body attached with the ion-exchange resin obtained as a result of sulfonating rosin.

14 Claims, 7 Drawing Sheets

Form 4 (related to Article 2)

30 industry & science tech. No. 1-3916

Report of Analysis

| Client | Address | 111-1, Motomachi 4-Chome, Komaki-shi Aichi |
|---|---|---|
| | Name (Name and representative's name) | NIDAIKI CO., LTD. |

| Requests | Infrared spectroscopic analysis (IR) |
|---|---|

| Samples | Names | Rosin (normal, sulfonated) | amounts | 2 |
|---|---|---|---|---|

Results of report:

1. Method of analysis
KBr method
2. Results of analysis
as described on the attached paper (Appendixes 1, 2)
   (Remainder of page intentionally left blank.)

| Receiving facility | Center for industry and science technology |
|---|---|

Results of analysis are described as above.

Heisei 31 year 1 month 30 date

Director of Aichi center for industry and science technology    KATO Junji (Notes) Name of sample is described as requested by client.

FIG. 4

SEPARATION MEMBRANE FOR REDOX FLOW BATTERY, AND METHOD OF MANUFACTURING SAID SEPARATION MEMBRANE

CROSS REFERENCE TO RELATED APPLICATIONS

This is a continuation application of International Patent Application No. PCT/JP2020/025535 filed on Jun. 29, 2020 claiming priority upon Japanese Patent Application No. 2019-176924 filed on Sep. 27, 2019, of which full contents are incorporated herein by reference.

BACKGROUND OF THE INVENTION

Field of the Invention

The present invention relates to a separation membrane for a redox flow battery dry-storable, easy to handle, and excellent in preventability of electrolyte-solution leakage, proton permeability, and durability in particular, and relates to a method of manufacturing such a separation membrane.

Description of the Background Art

For the separation membrane used in the redox flow battery interposed between catholyte solution and anolyte solution opposed to each other within a cell container, an ion-exchange membrane has conventionally been adopted as having properties of allowing protons (hydrogen ion $H^+$) to permeate therethrough but prohibiting metal ions in each electrolyte from permeating therethrough during charge and discharge.

Typical examples of the ion-exchange membrane are shown as follows. Patent Document 1 discloses a membrane impregnated with electrolyte manufactured by, e.g., a melting method and a wet method as a porous substrate membrane having thereon pores communicating in a surface direction and communicating in a thickness direction between both surfaces, of which pores on a whole peripheral end are blocked. Patent Document 2 discloses a fuel cell separator having a flat plate for separating the fluid and a flow-path plate for guiding the fluid, both of which are adhered to each other through a chemical substance containing rosin ester. Patent Document 3 discloses the invention of a separate membrane for a battery obtained as a result of compositing a cross-linked polymer to a polytetrafluoroethylene porous membrane with an anionic group, which porous structure is formed by a stretching method and a pore-forming method. No membrane for a redox flow battery like the later-described present invention, has been found out however, of which: a protective film is formed on pores and both surfaces of a sheet substrate having thereon a number of pores communicating between the both surfaces; and the protective film is attached with an ion-exchange membrane having a matrix formed of an ion-exchange resin dispersed therein with an inorganic porous powdery body attached with the ion-exchange resin obtained as a result of sulfonating rosin.

Conventional separation membranes for batteries are of two types, i.e., a wet storage type and a dry storage type. Except for the dry storage type such as a certain perfluorocarbon sulfonic acid polymer membrane represented by, e.g., Nafion (registered trademark), there have been some membranes to be in storage under the conditions of, e.g., being enclosed in a bag filled with 3% salt solution placed in a cool dark place due to the fact that the membranes deteriorate significantly when dried. In all examples described above, a porous film is used as the substrate and an ion-exchange group is introduced into the porous film substrate. Due to a relatively weak bond between the porous film and the ion-exchange membrane, there have been probabilities that the membrane would be caused, by repeated use or contact with air, to deteriorate so as to change in performance, and alternatively, to undergo swelling and contraction so as to change in shape. Those membranes thus had issues in handling under the conditions of: being preserved in a wet state at all times without drying out; being treated for installation within a pool-like facility; and being kept in a wet environment even after having been installed. Liquid permeation through a membrane has also been an issue as a major cause of failure, resulting in a serious matter about controlling the environmental temperature during storage and operation to prevent swelling due to high temperature causing, e.g., increased liquid permeation rate with increase in time.

PRIOR ART DOCUMENTS

Patent Documents

Patent Document 1: Japanese Patent Application Laid-Open Publication No. H11-86909
Patent Document 2: Japanese Patent Application Laid-Open Publication No. 2007-134147
Patent Document 3: Japanese Patent Application Laid-Open Publication No. 2000-235849

Problems to be Solved

Most of the separation membranes for batteries commonly used to date are ion-exchange membranes each obtained as a result of attaching an ion-exchange resin to a porous film having pores formed on a plastic film or an engineering plastic film as described above. Those porous films have pore diameters distributed, within a range of 10 to 10,000 nm, in a much various manner in comparison to those of mesopore diatomaceous earth, resulting in issues such as easily causing electrolyte-solution leakage. The inventor of the present application had the findings, in the course of diligent research on the separation membranes for batteries, that a stable separation membrane which is resistant to detachment of the ion-exchange resin even when a battery is repeatedly charged and discharged and is capable of preventing electrolyte leakage and enhancing proton permeation, could be obtained as a result of attaching a phenolic ion-exchange resin to an inorganic porous powdery body of diatomaceous earth whose pore diameters are distributed, within a range of, e.g., 2 to 50 nm, in a less various manner in comparison to those of the above-described porous film, and then the inventor filed a Japanese patent application now granted patent with respect to such an invention entitled "Separation Membrane for Red Flow Battery and Method of Manufacturing said Separation Membrane" (U.S. Pat. No. 5,750,604).

SUMMARY OF THE INVENTION

The separation membrane for the redox flow battery in the above-described previously patented invention (hereinafter, referred to as "phenolic ion-exchange resin membrane") has been dry-storable and therefore easy to handle, and excellent in battery performance, chemical resistance, durability, and proton permeability, and the separation membrane has been superior to the conventional separation membranes in terms of preventing electrolyte-solution leakage.

As a result of further accumulated research, however, the inventor of the present application is now led to the findings that an ion-exchange resin made of rosin-based resin is much superior to the ion-exchange resins made of resins other than the rosin-based resin in terms of preventing electrolyte-solution leakage, and that, as a result of pre-treating the sheet substrate of polyester-based nonwoven fabric, a protective film is made of, e.g., acrylic resin so as to prevent deterioration due to sulfuric acid, and therefore is capable of sulfonating the rosin-based resin attached to the sheet substrate.

The principal objective of the present invention is to provide a separation membrane for a redox flow battery that extremely excels in proton permeability and prevention of electrolyte-solution leakage, and a method of manufacturing said separation membrane.

Means for Solving Problems

In order to achieve the above-described objective, the present invention provides a separation membrane for a redox flow battery characterized by comprising: a protective film formed on each of both surfaces of a sheet substrate along with pores, the sheet substrate having thereon a number of pores communicating between the both surfaces; and an ion-exchange membrane adhered to the protective film, the ion-exchange membrane having a matrix formed of an ion-exchange resin dispersed therein with an inorganic porous powdery body attached with the ion-exchange resin obtained as a result of sulfonating rosin.

Further, in order to achieve the above-described objective, the present invention provides the separation membrane for the redox flow battery further characterized in that the rosin includes at least any one selected from the group consisting of gum rosin, tall rosin, wood rosin, polymerized rosin, disproportionated rosin, hydrogenated rosin, fortified rosin, rosin ester, and rosin metal salt.

Further, in order to achieve the above-described objective, the present invention provides the separation membrane for the redox flow battery further characterized in that the sheet substrate includes a polyester-spunbonded nonwoven fabric, and the protective film is made of an acrylic resin.

Further, in order to achieve the above-described objective, the present invention provides the separation membrane for the redox flow battery further characterized in that a resin of the matrix includes at least any one of lacquer and resins belonging to rosin combined with the ion-exchange resin.

Further, in order to achieve the above-described objective, the present invention provides the separation membrane for the redox flow battery further characterized in that the inorganic porous powdery body includes at least any one of diatomaceous earth, sepiolite, zeolite, perlite, calcium silicate, kaolin, attapulgite, vermiculite, cristobalite, and other porous silica bodies.

Further, in order to achieve the above-described objective, the present invention provides the separation membrane for the redox flow battery further characterized in that the ion-exchange resin or the ion-exchange membrane contains titanium oxide.

Further, in order to achieve the above-described objective, the present invention provides the separation membrane for the redox flow battery further characterized in that the ion-exchange resin or the ion-exchange membrane is added at least with any one of nitric acid, dilute nitric acid, and oxalic acid.

In order to achieve the above-described objective, the present invention provides a method of manufacturing a separation membrane for a redox flow battery, characterized by comprising the steps of: preparing a coating solution containing an inorganic porous powdery body and a sulfonating agent in a rosin solution obtained as a result of mixing a rosin and a solvent; forming a protective film on a sheet substrate having thereon a number of pores communicating between both surfaces thereof; applying the coating solution to the protective film; and drying the coating solution having been applied to the protective film, and thereafter heating the coating solution having been dried so that a sulfonic acid group is introduced into the rosin and thereby an ion-exchange resin is obtained, wherein an ion-exchange membrane is so formed as to have a matrix dispersed therein with the inorganic porous powdery body attached with the ion-exchange resin.

Further, in order to achieve the above-described objective, the present invention provides the method of manufacturing the separation membrane for the redox flow battery characterized in that the rosin includes at least any one selected from the group consisting of gum rosin, tall rosin, wood rosin, polymerized rosin, disproportionated rosin, hydrogenated rosin, fortified rosin, rosin ester, and rosin metal salt.

Further, in order to achieve the above-described objective, the present invention provides the method of manufacturing the separation membrane for the redox flow battery further characterized in that the sheet substrate includes a polyester-spunbonded nonwoven fabric, and the method further comprises the steps of immersing the sheet substrate in a dilute solution of acrylic resin and drying the sheet substrate having been immersed in the dilute solution, and thereby a protective film made of an acrylic resin is formed.

Further, in order to achieve the above-described objective, the present invention provides the method of manufacturing the separation membrane for the redox flow battery further characterized in that a resin of the matrix includes at least any one of lacquer and resins belonging to rosin combined with the ion-exchange resin.

Further, in order to achieve the above-described objective, the present invention provides the method of manufacturing the separation membrane for the redox flow battery further characterized in that the inorganic porous powdery body includes at least any one of diatomaceous earth, sepiolite, zeolite, perlite, calcium silicate, kaolin, attapulgite, vermiculite, cristobalite, and other porous silicas.

Further, in order to achieve the above-described objective, the present invention provides the method of manufacturing the separation membrane for the redox flow battery further characterized in that the ion-exchange resin or the ion-exchange membrane contains titanium oxide.

Further, in order to achieve the above-described objective, the present disclosure provides the method of manufacturing the separation membrane for the redox flow battery further characterized in that the ion-exchange resin or the ion-exchange membrane is added at least with any one of nitric acid, dilute nitric acid, and oxalic acid.

Advantageous Effects of the Invention

According to the present invention, the separation membrane for the redox flow battery is dry-storable as described above, and therefore is capable of being treated for installation to a cell container within a dry space without being treated in the water, thereby capable of being mass-produced, automatically assembled by robots, installed with extreme ease, in the future, without the need for any equipment such as a pool-like facility, which results in economic benefits. In addition to the above-described handling effects, the ion-exchange membrane obtained through the use of the inorganic porous powdery body having pores whose size is on the order of a few nanometers such as those of mesopore diatomaceous earth or sepiolite as well as obtained through the use of the rosin-based resin and the ion-exchange resin derived from the rosin-based resin, is capable of being improved in proton permeability, but reduced extremely in electrolyte-solution leakage, and also enforced in tensile strength and water-pressure resistance. Further, it is considered that such a separation membrane is capable of being applied to fuel cells and the like.

BRIEF DESCRIPTION OF THE DRAWINGS

FIG. 4 depicts a cover page of an infrared spectroscopic analysis report.

DESCRIPTIONS OF EMBODIMENTS OF THE INVENTION

Figure 1:
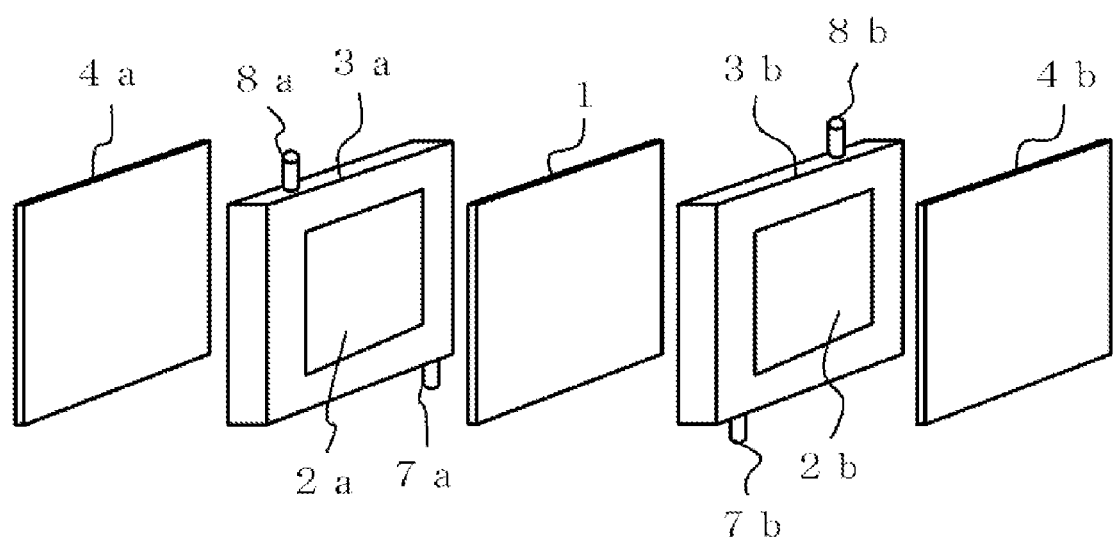
FIG. 1 is an explanatory view of a cell used in a redox flow battery for a performance test.

Hereinafter, embodiments for carrying out the present invention (hereinafter, referred to as "embodiments") will be described in detail. The present invention is, however, not limited to such embodiments. A separation membrane for a redox flow battery in an embodiment according to the present invention is characterized by applying thereto a rosin-derived ion-exchange membrane, and more specifically, characterized by forming the ion-exchange membrane obtained as a result of dispersing an inorganic porous powdery body attached at least with an ion-exchange resin into a matrix formed of the ion-exchange resin on pores and both surfaces of a sheet substrate having thereon a number of pores communicating between the both surfaces.

A sheet substrate used in an embodiment is a well-known substrate for ion-exchange membrane at least having a number of pores communicating in a thickness direction between both surfaces thereof or communicating in a surface direction capable of holding an inorganic porous powdery body within the pores thereof as well as having acid resistance against electrolyte solution and strength, and such a sheet substrate includes woven knitted fabric, non-woven fabric, net-like material, or porous sheet widely used for its shape, but is not limited to these materials. For example, polyester fiber, polyethylene fiber, polypropylene fiber, glass fiber, aramid fiber, polyamide fiber, other synthetic staple fibers, natural fibers such as hemp or pulp, or a combination of these short fibers as well as inorganic porous powdery bodies such as diatomaceous earth, and added with a binder, if necessary, may be formed by a dry method or a wet method into a sheet shape. A polyester-spunbonded nonwoven fabric, in particular, is preferred in terms of high strength.

For the inorganic porous powdery body, it is preferred that material having fine pores to be attached with the ion-exchange resin be used, and a granular shaped porous material such as diatomaceous earth, sepiolite, zeolite, perlite, calcium silicate, kaolin, attapulgite, vermiculite, cristobalite, or the other silica be used. Diatomaceous earth and sepiolite, in particular, are preferable. In addition, natural or artificial porous silica such as IMPS (registered trademark), mesoporous silica having pore diameters within a range of 2-50 nm in a honeycomb-like structure synthesized with surfactant micelles as a template, may be provided.

Diatomaceous earth contains mainly silicon dioxide (silica $SiO_2$), with the properties of high acid resistance and rich moisture absorption and desorption, and mesopore diatomaceous earth having pore diameters within a range of 2 to 50 nm, in particular, as an embodiment according to the present invention is more preferable for the separation membrane for the redox flow battery as an embodiment according to the present invention. This is because such a mesopore diatomaceous earth has a specific surface area, 100 $m^2/g$, approximately 4 times larger than that of the general diatomaceous earth, and has a micropore volume approximately 5 times larger than that of the general diatomaceous earth, which results in providing a larger capacity to hold the ion-exchange resin within the micropores thereof. Further, a calcined mesopore diatomaceous earth obtained as a result of calcining the diatomaceous earth at approximately 800° C. is capable of taking-in to hold more ion-exchange resin within the micropores after removal of organic or combustible foreign matters having been clogged therewith, which results in improving proton conductivity.

Sepiolite containing mainly hydrated magnesium silicate and further containing magnesium oxide and aluminum oxide, has pore diameters within a range of 1 to 20 nm and a specific surface area as large as 230-300 $m^2/g$, and pores exposed at the surface of Sepiolite particles are connected with one another in a mesh-like manner inside the particles, thereby to hold easily the ion-exchange resin. Sepiolite includes a silanol group capable of enhancing the absorption with water and organic substance through hydrogen bond, and reducing the expansion even in the presence of water or solvent through covalent bond, thereby to excel in retention of the ion-exchange resin.

When the ion-exchange resin to be attached to the inorganic porous powdery body held in the sheet substrate or to have the inorganic porous powdery body dispersed in the matrix contains the rosin-derived ion-exchange resin, such an ion-exchange resin is capable of effectively improving proton permeability and reducing electrolyte-solution leakage. Further, polycondensation products containing commonly known ion-exchange groups may also be widely used together with the rosin-derived ion-exchange resin. For example, negatively charged ion-exchange groups include sulfonic acid group, carboxylic acid group, phosphonic acid group, phosphonic acid group, and the like, and positively charged ion-exchange groups include pyridinium group, quaternary ammonium group, tertiary amine group, phosphonium group, and the like. Among them, the sulfonic acid group can improve proton conductivity, and the pyridinium group is excellent in proton selective permeability, both of which have oxidation resistance, and therefore the sulfonic acid group and the pyridinium group are preferred for the exchange groups in an embodiment according to the present invention. Also, any resin that such ion-exchange groups are introduced into may be adopted; however, a three-dimensional cross-linkable resin may be used in order to prevent swelling and deformation.

The rosin for the ion-exchange resin in an embodiment according to the present invention includes at least any one selected from the group consisting of natural rosin, polymerized rosin, disproportionated rosin, hydrogenated rosin, reinforced rosin, rosin ester, and rosin metal salt. Natural rosin includes gum rosin, tall rosin, and wood rosin. The gum rosin is obtained as a result of collecting raw pine resin secreted from the scratched trunk of a pine tree, filtering it to remove impurities, and then distilling it to separate low boiling point turpentine oil. The tall rosin is obtained as a result of refining crude tall oil recovered as tall oil during a kraft process by which pulp fibers are separated under a high temperature and a high pressure from pinewood chips added with chemical substances. The wood rosin is obtained as a result of performing a solvent extraction from chips formed by cutting dug-up felled pine tree stumps, and thereafter separating turpentine from the solvent.

The polymerized rosin is obtained as a result of polymerizing natural rosin in the form of a derivative having a dimerized resin acid from the natural rosin. The disproportionated rosin is obtained as a result of causing disproportion reaction to occur on natural rosin. The hydrogenated rosin is obtained as a result of causing natural rosin to undergo hydrogenation so that hydrogen is added to the conjugated double bonds of natural rosin. The reinforced rosin is unsaturated carboxylic acid-modified rosin obtained as a result of causing $\alpha,\beta$-unsaturated carboxylic acid and natural rosin to undergo a reaction, and the unsaturated carboxylic acid-modified rosin includes fumaric acid, maleic anhydride, itaconic acid, acrylic acid, methacrylic acid, and the like. The rosin ester is obtained as a result of esterifying natural rosin. The rosin metal salt is obtained as a result of substituting metal for hydrogen in the carboxyl group of natural rosin.

The ion-exchange resin made from the rosin is formed by dissolving or dispersing at least one of the above-described sorts of rosin into an organic solvent or dispersant such as alcohol, ether, acetic acid, glacial acetic acid, chloroform, and benzene, and thereafter sulfonating the rosin with a well-known sulfonating agent such as concentrated sulfuric acid, hot concentrated sulfuric acid, fuming sulfuric acid, sulfur trioxide, chlorosulfonic acid, and sulfamic acid. The inorganic porous powdery body is then attached with the formed ion-exchange resin. Further, by impregnating the sheet substrate with the mixed solution containing the inorganic porous powdery body attached with the ion-exchange resin, and thereafter drying under heat the sheet substrate an ion-exchange membrane having the inorganic porous powdery body attached with the ion-exchange resin dispersed in the matrix is formed on the pores and surfaces of the sheet substrate.

The ion-exchange resin on a large number of inorganic porous powdery bodies is obtained by sulfonating the rosin attached to said powdery bodies dispersed in the matrix forms a coating film on the pores and the surfaces of the sheet substrate. As a result, the ion-exchange resin is capable of preventing from the detachment so as to be improved in membrane durability as well as preventing the electrolyte-solution leakage. The rosin, in particular, is a mixture of several carboxyl group isomers as a hydrophilic group such as abietic acid, pimaric acid, dehydroabietic acid, palustric acid, isopimaric acids, and neoabietic acid. As a result of dispersing a large number of inorganic porous powdery bodies attached with ion-exchange resins on the outer periphery and inside the micropores of said powdery bodies into the matrix formed of a resin having a hydrophilic group, e.g., carboxyl group and hydroxyl group such as rosin and lacquer, it is considered that affinity is improved between the matrix and the electrolyte solution, and that a large number of proton-conducting paths are formed along the outer surfaces of their respective powdery bodies and the walls of internal micropores of the powdery body, which facilitates proton permeability.

A pretreatment solution in an embodiment according to the present invention includes a solution capable of forming a film (protective film) on the pores and the surfaces of the sheet substrate, and it is preferred that a resin be so selected as to fulfill the conditions of adhesivity to the sheet substrate and affinity with the ion-exchange resin as a component of a coating solution, and further, of capability of suppressing leakage of the electrolyte solution. For example, synthetic resins conventionally used as a vehicle for paints, such as acrylic resins, polyester resins, urethane resins, vinyl chloride resins, epoxy resins, melamine resins, fluorine resins, silicone resins, butyral resins, phenol resins, vinyl acetate resins, water-soluble resins or hydrophilic resins for paints composed of mixtures, copolymers, and modified forms of these resins, or hydrolyzable organosilicon compounds such as alkoxysilane or partial hydrolysates of these may be mixed so as to be used.

For the lacquer used as the matrix in an embodiment according to the present invention, a general-purpose lacquer is used without particularly limiting its type and origin. Lacquer is typically refined, by purifying "Arami-Urushi" as lacquer sap extracted from the lacquer tree, for usages such as paints. It is preferred that "Kurome-Urushi" be obtained as a result of: filtering "Arami-Urushi" under heating so as to remove dust and tree bark at the initial stage; and then adding iron hydroxide to the filtered raw lacquer so that it is colored black at the refining stage of evening out for quality and providing smoothness and luster.

Drying the lacquer attached to the sheet substrate after having applied the lacquer to the sheet substrate so as to form a coating film is performed not in expectation of any water evaporation but with the aim of causing urushiol as a main component of lacquer to be polymerized so as to form macromolecules in mesh thereby to cure with the aid of an enzyme called laccase under the moderate temperature and humidity. In addition, it cures by baking under heat at around 20 to 190° C. It is preferred that the baking process be applied for curing in an embodiment according to the present invention in consideration of shortening time.

The above-described lacquer is mixed with a mixed solution of rosin, and a resultant solution is added with the inorganic porous powdery bodies and dispersant, and a further resultant solution is stirred so that a coating solution is prepared. As a result of impregnating the above-treated sheet substrate with the coating solution, and thereafter drying it under heat, the ion-exchange resin is attached firmly to the inorganic porous powdery bodies and the sheet substrate when the lacquer cures. At this time, it is preferred that a mixing ratio of the inorganic porous powdery bodies be set as high as possible to such an extent that the leakage of electrolyte solution does not occur. This is because, the higher the mixing ratio of the inorganic porous powdery bodies in the coating solution is, the higher the probability of contact between the inorganic porous powdery bodies and the electrolyte solution is, which results in increase of the selective permeability of proton.

The coating solution is prepared by mixing: a rosin solution obtained as a result of dissolving or dispersing at least one of a plurality of sorts of rosin into a solvent or dispersant; inorganic porous powdery bodies such as diatomaceous earth; and a well-known sulfonating agent such as concentrated sulfuric acid, hot concentrated sulfuric acid, or fuming sulfuric acid, and then leaving a resultant solution for a while. Lacquer may also be mixed along with the rosin. Lacquer acts as an admixture for the rosin and concentrated sulfuric acid. The coating solution is added and stirred with a solvent thereby to obtain a coating diluent, and the sheet substrate is so immersed in the coating diluent as to be impregnated therewith, and thereafter is dried under heat so as to cure as the rosin-derived ion-exchange resin attached firmly to the inorganic porous powdery bodies and the sheet substrate.

In preparation of the coating solution or the coating diluent, with respect to 100 parts by mass of rosin, an amount of glacial acetic acid (solvent) is set preferably to be within a range of 30 to 200 parts by mass, and an amount of inorganic porous powdery bodies (diatomaceous earth) is set preferably to be within a range of 5 to 100 parts by mass, particularly preferably to be within a range of 10 to 70 parts by mass. If an amount of inorganic porous powdery bodies (diatomaceous earth) is less than 5 parts by mass, there is a probability that the proton selective permeability would be insufficient, and if an amount of the inorganic porous powdery bodies (diatomaceous earth) is larger than 70 parts by mass, there is a probability that said powdery bodies would be detached. Further, with respect to 100 parts by mass of rosin, an amount of a well-known sulfonating agent such as hot concentrated sulfuric acid is set preferably to be within a range of 5 to 30 parts by mass, particularly preferably to be within a range of 10 to 30 parts by mass. If it is less than 5 parts by mass, it is difficult to maintain the performance of the ion-exchange resin, and if it is larger than 30 parts by mass, it is difficult to prevent the electrolyte-solution leakage due to deterioration. In addition, the rosin-derived ion-exchange resin or the ion-exchange resin other than rosin may be added and mixed, appropriately, in amount within such a range that the leakage of electrolyte-solution does not occur. An emulsifier, a compatibilizer, a viscosity modifier, a heat stabilizer, an antioxidant, a surfactant, a cross-linking agent, a reaction accelerator, and other additives may also be added as needed.

Hereinafter, examples of the method of manufacturing the separation membrane for the redox flow battery according to the present invention will be described with reference to EXAMPLES 1, 2; however, the present invention is not limited to such examples. In the following examples, the rosin may be mixed with at least one sorts of rosin selected from the group consisting of gum rosin, tall rosin, wood rosin, polymerized rosin, disproportionated rosin, hydrogenated rosin, reinforced rosin, rosin esters, and rosin metal salts. For example, gum rosin as a main component mixed with polymerized rosin or the like may be used. EXAMPLES 1 and 2 are the examples having the rosin, in accordance with the present invention, obtained as a result of mixing gum rosin and polymerized rosin.

Example 1

Figure 3:
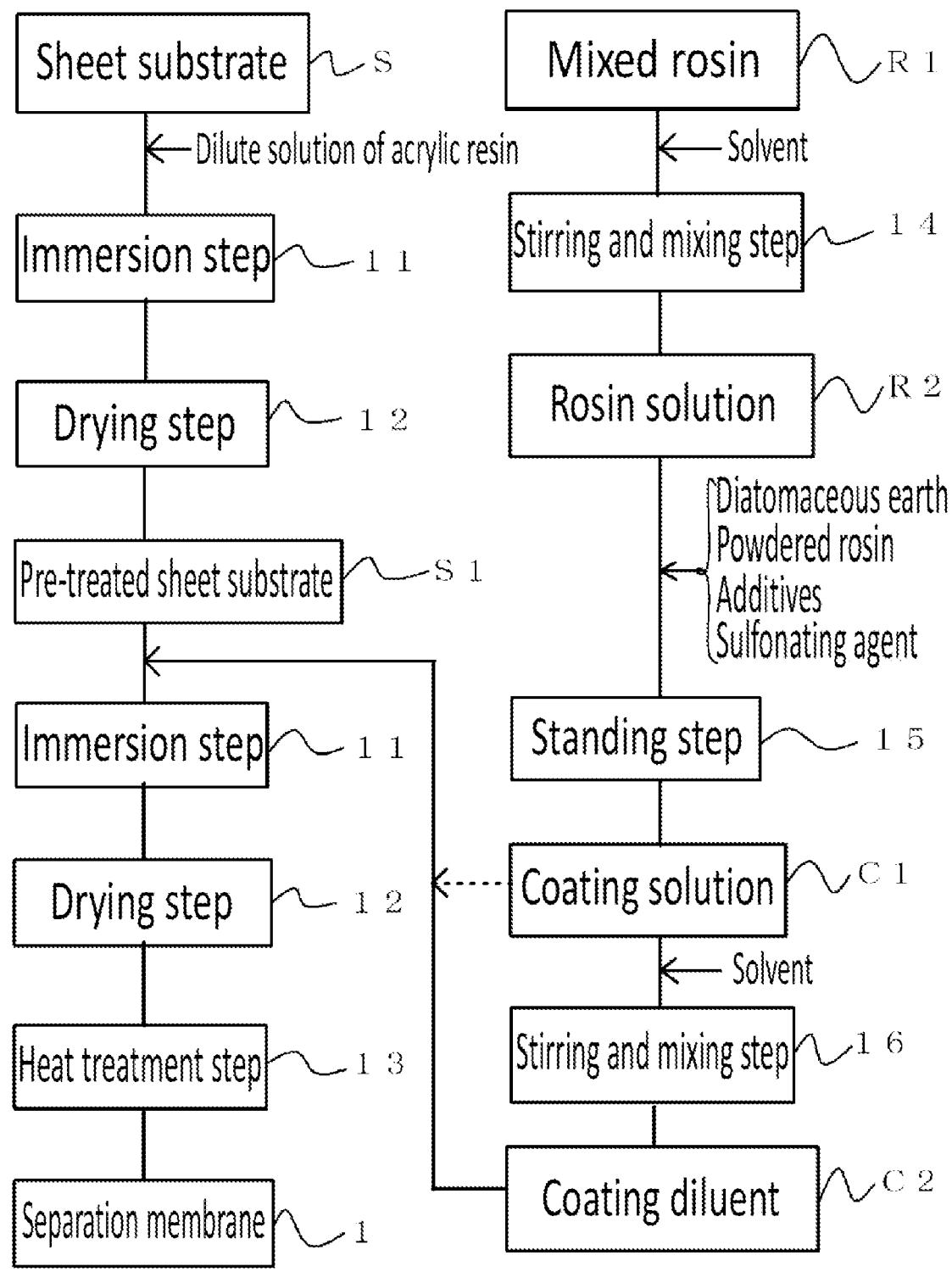
FIG. 3 is a flow of manufacturing the separation membranes for the redox flow battery in EXAMPLES 1 and 2.
Figure 5:
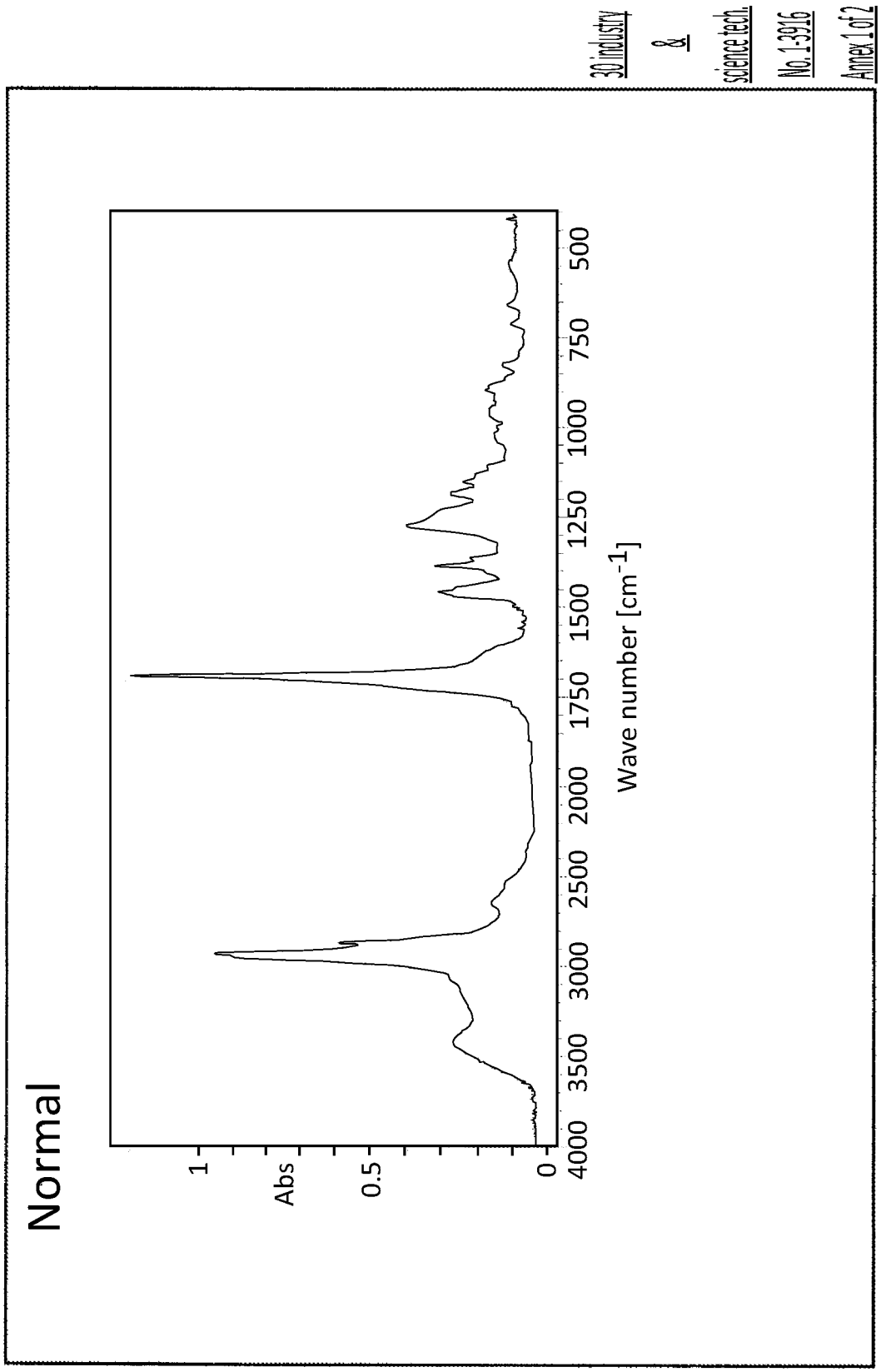
FIG. 5 depicts an infrared spectrum of a non-sulfonated sample.
Figure 6:
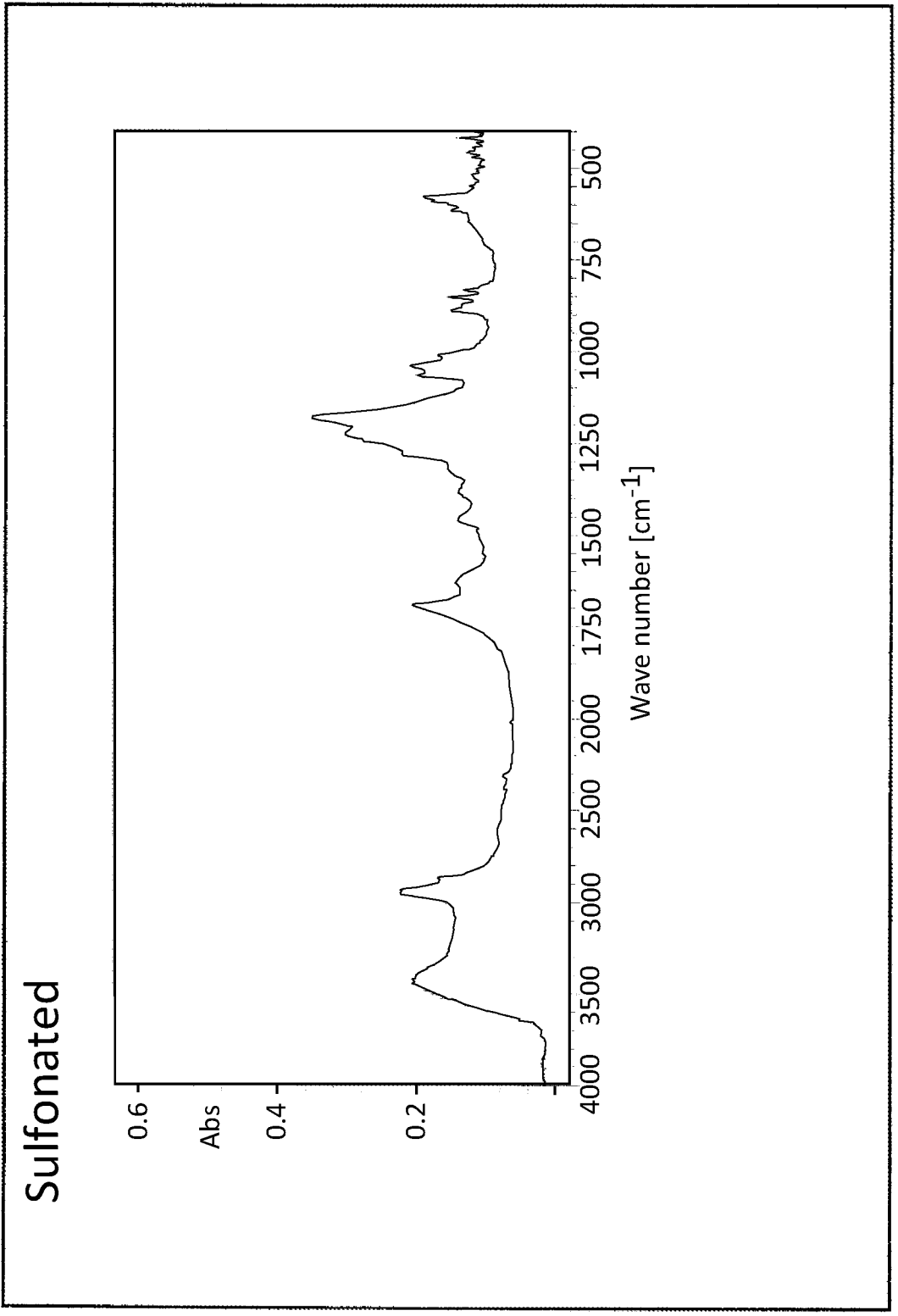
FIG. 6 depicts an infrared spectrum of a sulfonated sample.
Figure 7:
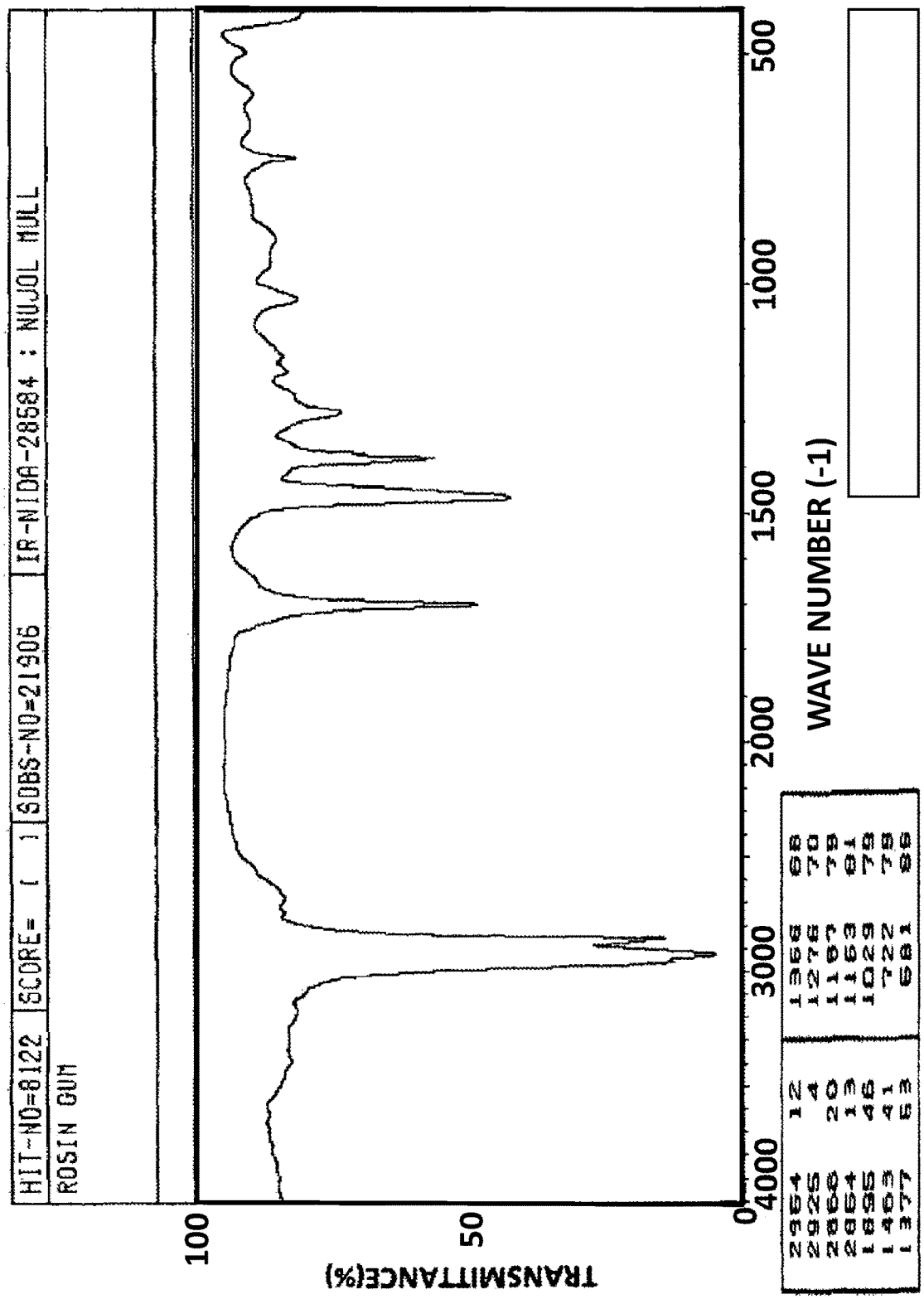
FIG. 7 depicts an infrared spectrum of rosin.

EXAMPLE 1 will be described with reference to FIG. 3.

First, rosin (R1), composed of gum rosin and polymerized rosin, and polymerized rosin are added with an appropriate amount of glacial acetic acid (solvent) and a small amount of hot concentrated sulfuric acid (sulfonating agent) and stirred (14) with a mixer to prepare a rosin solution (R2). Next, diatomaceous earth and hot concentrated sulfuric acid are added to the rosin solution (R2), stirred, and left to stand for 1 hour or more (15) to prepare a rosin coating solution (C1) according to the above-mentioned formulation. At this time, the solution may be left in a vacuum state as appropriate to defoam and be introduced into the pores of the inorganic porous powdery bodies such as diatomaceous earth. Further, a solvent is added to the coating solution (C1) and stirred (16) to appropriately regulate the viscosity to obtain a coating diluent (C2) forming the matrix.

<Preparation 1—Coating Solution> (Unit: Part by Mass)

| | | |
|---|---|---|
| 1) | Rosin (Gum rosin/Polymerized rosin) | 120 |
| 2) | Glacial acetic acid (Solvent) | 120 |
| 3) | Hot concentrated sulfuric acid (Sulfonating agent) | 1.0-3.0 |

<Preparation 2—Coating Diluent>

| | | |
|---|---|---|
| 4) | Diatomaceous earth (average particle size 5-10 μm) | 30-40 |
| 5) | Glacial acetic acid (viscosity regulation solvent) | 50-120 |
| 6) | Hot concentrated sulfuric acid (Sulfonating agent) | 10-30 |

Next, a case where a polyester (hereinafter, referred to as "PET") spunbonded nonwoven fabric is used for the core material as the sheet substrate (S) will be described. The structure of the PET spunbonded nonwoven fabric may be decomposed when it comes into direct contact with sulfuric acid since it has an ester bond. Therefore, in order to avoid damage to the sheet substrate (S), polyacrylic acid ("G-36" manufactured by Arakawa Chemical Industry Co., Ltd.), which is a kind of diluted solution of acrylic resin, is prepared in advance as a pretreatment solution for the sheet substrate (S), and the sheet substrate (S) is immersed in the pretreatment solution (11), followed by being passed between pressure rolls to squeeze out the pretreatment solution, and dried (12), thus become the pre-treated sheet substrate (S1) with a protective film of acrylic resin formed on the sheet substrate (S). The pretreatment process according to the above is repeated one or more times. The above-described "G-36" is an aqueous dispersion of unneutralized polyacrylic acid, containing a non-volatile content of 15 to 16%, a pH of 1.5 to 2.0, a specific gravity of 1.034 g/cm$^3$ at 25° C., and a viscosity of 30,000 to 50,000 mPa·s at 25° C.

Next, the pre-treated sheet substrate (S1) is immersed (11) in the coating diluent (C2) prepared above to attach the coating diluent (C2) to the pre-treated sheet substrate (S1). Then, the pre-treated sheet substrate (S1) is pulled out of the coating diluent (C2), and the thickness of the coating diluent attached and left flat in a predetermined thickness to the front and back surfaces of the substrate is adjusted by the gravure coating method, followed by natural drying to the extent that it retains moisture as appropriate (12), and then heat-treated at 100 to 200° C. for about 1 to 5 hours (13) to sulfonate the rosin to form a rosin ion-exchange resin, and thus the separation membrane for the redox flow battery (1) of which the rosin ion-exchange resin attached to the pre-treated sheet substrate (S1) was obtained. It is to be noted that the pre-treated sheet substrate (S1) was confirmed not to be affected by sulfuric acid even when in contact with the coating diluent (C2).

The method of applying the coating solution is not limited to the above-described dip-coating method, but other methods such as knife coating, roller coating, spray coating, rotary screen coating, spread coating, roll coating (direct roll coating and reverse roll coating), coating by equalizer rod, impregnation, in-mold coating by slush molding, in-mold coating by rotational molding, in-mold coating by cavity molding and the like can be employed.

Example 2

The detailed description of EXAMPLE 2 will be omitted since it is the same as EXAMPLE 1 except that an additive such as a surfactant and titanium oxide is used.
<Preparation 1—Coating Solution> (Unit: Part by Mass)

| 1) | Rosin (Gum rosin/Polymerized rosin) | 120 |
| 2) | Glacial acetic acid (Solvent) | 120 |
| 3) | Hot concentrated sulfuric acid (Sulfonating agent) | 1.0-3.0 |

<Preparation 2—Coating Diluent>

| 4) | Diatomaceous earth | 30-40 |
| 5) | Glacial acetic acid (viscosity regulation solvent) | 50-120 |
| 6) | Hot concentrated sulfuric acid (Sulfonating agent) | 10-30 |
| 7) | Nitric acid | 5-10 |
| 8) | Oxalic acid | 10-30 |
| 9) | Surfactant | 0.1-0.5 |
| 10) | Titanium oxide | 30-40 |

The separation membrane for the redox flow battery obtained through each step described above is composed of inorganic porous powdery bodies attached and fixed with an ion-exchange resin made mainly of natural rosin unlike the conventional separation membranes for redox flow batteries whose perforation is processed after a film is sulfonated, and therefore is excellent in proton conductivity, battery performance, chemical resistance, and durability, and has the properties of rosin suppressing the electrolyte-solution leakage and allowing the dry preservation, without a need for storing in a wet state. However, it is the same as the conventional case that the separation membrane must be immersed in electrolyte solution after installing until sufficiently moistened before charging and discharging.

Figure 2:
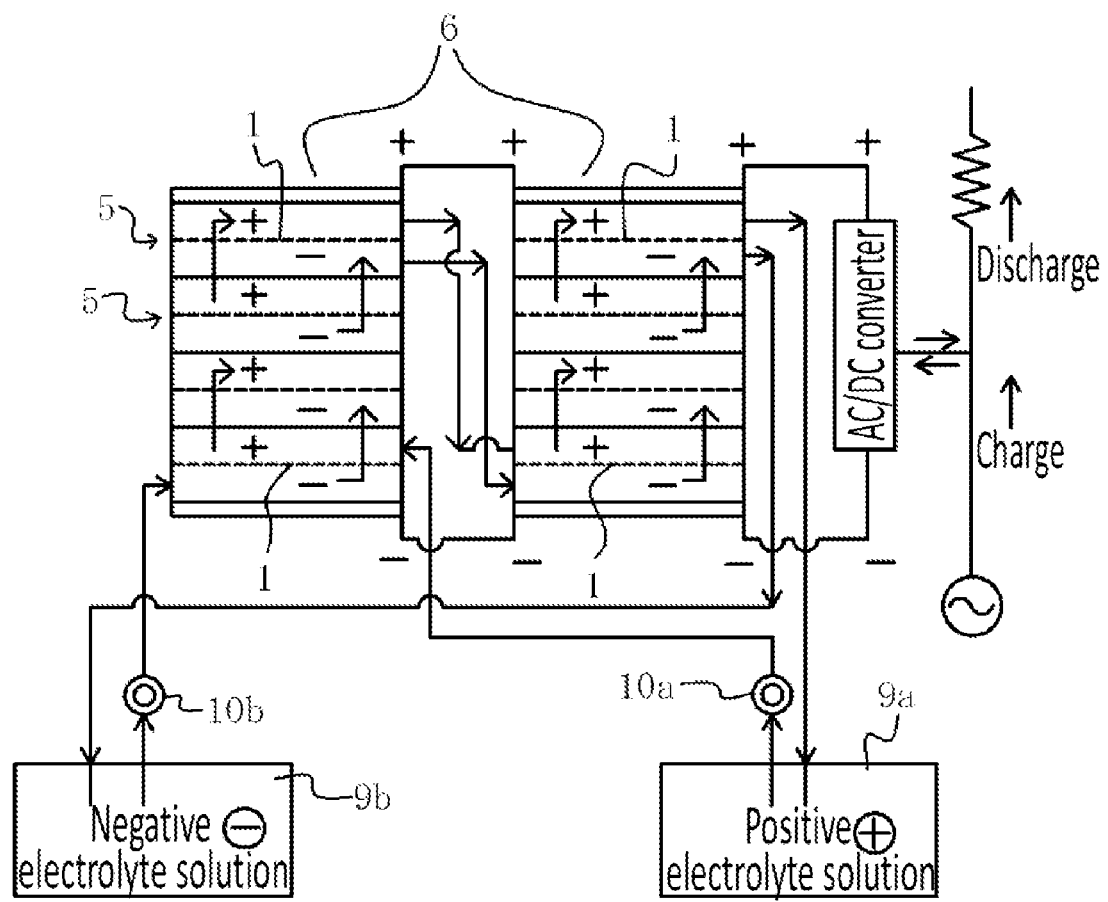
FIG. 2 is an explanatory view showing the redox battery for the performance test.

Next, the obtained separation membranes for redox flow batteries each was cut in a predetermined size to prepare samples for a performance test of the rosin-made separation membranes. The performance test samples were installed in a redox flow battery to confirm the performance. As shown in FIG. 1, the redox flow battery used in this performance test of the separation membrane was based upon a cell 5, as a constituent unit, configured such that the separation membrane for the redox flow battery 1 was placed at the center, and interposed at both sides between a positive electrode frame 3a provided with a positive electrode 2a and a negative electrode frame 3b provided with a negative electrode 2b, and said electrode frames 3a and 3b were abutted at both outer sides by bipolar plates 4a and 4b, respectively. The positive electrode frame 3a was provided with positive electrode liquid suction/discharge ports (7a, 8a), and the negative electrode frame 3b was provided with negative electrode liquid suction/discharge ports (7b, 8b). Wired as shown in FIG. 2, two sets each having multiply-stacked cells 5 (four cells) were used as cell stacks 6, 6, respectively. The suction and discharge ports 7a, 7a on their respective positive electrode frames (3a, 3a)' sides were connected to each other by pipes, connected to the positive electrolyte solution tank 9a via the positive electrode pump 10a, and the suction and discharge ports 8a, 8a on their respective positive electrode frames (3a, 3a)' sides were connected to each other by pipes, connected to the positive electrolyte solution tank 9a. Similarly, the suction and discharge ports 7b, 7b on their respective negative electrode frames (3b, 3b)' sides were connected to each other by pipes, connected to the negative electrolyte solution tank 9b via the negative electrode pump 10b, and the suction and discharge ports 8b, 8b on their respective negative electrode frames (3b, 3b)' sides were connected to each other by pipes, connected to the negative electrolyte solution tank 9b. It was configured so that each electrolyte solution of the positive electrode and the negative electrode circulate through each cell of each cell stack 6, 6 and the electrolyte solution tank by the positive electrode pump 10a and the negative electrode pump 10b. It is to be noted that each line connecting the cell stack, the electrolyte solution tank, and the AC/DC converter in FIG. 2 denotes the electrolyte path or the electric circuit.

The separation membranes 1 for the redox flow battery obtained in the example were respectively set in the performance-test redox flow battery, and the pump 10 was run, and voltage was applied between the two electrodes of the battery via AC/DC converter at a timing when the separation membranes 1 for the redox flow battery were sufficiently moistened with the electrolyte solution, and the color change of the electrolyte solution was observed visually. The positive electrolyte solution and the negative electrolyte solution are to be separately sent from the positive electrolyte solution tank 9a and the negative electrolyte solution tank 9b to the positive electrode frame (3a)'s side and the negative electrode frame (3b)'s side, respectively, by the pump 10. In the initial charge, a tetravalent vanadium electrolyte solution is put into each of the positive electrolyte solution tank 9a and the negative electrolyte solution tank 9b, and when electrolytic reduction begins, vanadium is oxidized from tetravalent (blue) to pentavalent (reddish yellow) at the positive electrode and is reduced from tetravalent (blue) to trivalent (blue-green) then to divalent (blackish green) at the negative electrode, and thereby the color change can be visually confirmed, in principle.

The dry-preserved separation membranes for redox flow batteries obtained in the example were respectively installed in the performance-test redox flow battery at a dry space to test the performance. As a result, in the example, the positive electrolyte solution changed from tetravalent blue to pentavalent reddish yellow, the negative electrolyte solution changed from tetravalent blue to trivalent blue-green, and then changed to divalent blackish green. In particular, the weights of both electrolyte solutions were measured after operating for 24 hours with pump rotation changed to set the pressure of the positive electrolyte solution and the negative electrolyte solution to 1:3 in ratio in order to check if the electrolyte solution leaks through the separation membrane, and the leakage was none. The fact that there was no color change in the tank after charging was completed also clearly indicated that there was no leakage of the electrolyte solution through the separation membrane. Further, the quick change in color of the electrolyte solution indicated that the battery was fully charged. The test was operated with 0.5 liters of electrolyte×6 V voltage, and 38.5 hours of charging time. The electromotive force was 1.3 V per unit cell. Even after charging and discharging were repeated a plurality of times, no decrement in performance was observed.

The AC impedance and the proton conductivity of the separation membranes for redox flow batteries obtained in the examples were studied at Aichi Center for Industry and Science Technology, and the results are shown below. Measurement equipment: Fuel Cell Testing System (CHINO, FC5100 series), Potentiostat/galvanostat (Autolab, PGSTAT302)

(Membrane of Example 1)

| | |
|---|---|
| Resistance value (Ω) | 72.3801 |
| Membrane thickness (cm) | 0.032 |
| Membrane width (cm) | 0.5 |
| Distance between electrodes (cm) | 0.5 |
| Proton conductivity (S/cm) | 0.4317 |

(Membrane of Example 2)

| | |
|---|---|
| Resistance value (Ω) | 64.3003 |
| Membrane thickness (cm) | 0.055 |
| Membrane width (cm) | 0.5 |
| Distance between electrodes (cm) | 0.5 |
| Proton conductivity (S/cm) | 0.2828 |

(Comparison: Phenolic Ion-Exchange Resin Membrane)

| | |
|---|---|
| Resistance value (Ω) | 89.33 |
| Membrane thickness (cm) | 0.0456 |
| Membrane width (cm) | 0.5 |
| Distance between electrodes (cm) | 0.5 |
| Proton conductivity (S/cm) | 0.2455 |

Further, the redox potentials (ORPs) of positive and negative electrolyte solutions measured by an oxidation-reduction potential meter in the performance test (see FIG. 2) are as follows.

(This time: Rosin-contained membranes, 4 cells×2)

Charging time: 40 hours (good storage performance)

ORP of tetravalent electrolyte (blue) before charging: 650 mV

ORP of pentavalent positive electrolyte (reddish yellow) after charging: 955 mV (950-1050) mV ORP of divalent negative electrolyte (blackish green) after charging: 35 mV (−50-+50) mV Potential difference: 920 mV <Verification of Sulfonic Acid Group by IR Spectrum Analysis>

Next, two types of coating solutions are prepared as shown below: coating solution (C2) and coating solution (C3) having the same formulation as coating solution (C2) except that sulfonating agent (hot concentrated sulfuric acid) is excluded from coating solution (C2). Next, sheet substrates (S) were coated on by the two coating solutions (C2), (C3), respectively, dried for 24 hours, and then heated at 120° C. for 3 hours, to prepare two types of samples (C2'), (C3'). Verification of the two types of obtained samples by infrared spectroscopic analysis (IR spectroscopic analysis) at Aichi Center for Industry and Science Technology resulted in that absorption bands peculiar to the sulfonic acid group were confirmed in one of the samples (C2') impregnated with the coating solution (C2) containing hot concentrated sulfuric acid showing absorption bands specific to sulfonic acid groups at around 1,180 cm$^{-1}$ and 1,050 cm$^{-1}$, while it was not confirmed in the other sample (C3') impregnated with the coating solution (C3) not containing hot concentrated sulfuric acid. The above analysis result has substantiated that the sample (C2') impregnated in the coating solution (C2) containing hot concentrated sulfuric acid became a sulfonic ion-exchange resin.

<Coating Solution (C2)> (Unit: Part by Mass)

| | | |
|---|---|---|
| 1) | Gum rosin | 100 |
| 2) | Glacial acetic acid (Solvent) | 100 |
| 3) | Diatomaceous earth | 30 |
| 4) | Hot concentrated sulfuric acid (Sulfonating agent) | 17 |

<Coating Solution (C3)> (Unit: Part by Mass)

| | | |
|---|---|---|
| 1) | Gum rosin | 100 |
| 2) | Glacial acetic acid (Solvent) | 100 |
| 3) | Diatomaceous earth | 30 |

The separation membrane for the redox flow battery according to the present invention is applicable as an electrolytic membrane also for various fuel cells other than redox flow batteries, or for various applications such as electrodialysis, desalting and salt reduction, pharmaceuticals, food processing, plating solvent treatment, waste liquid treatment. The technical scope of the present invention shall be broadened to cover matters unless contrary to the spirit of the present invention.

INDUSTRIAL APPLICABILITY

The separation membrane for the redox flow battery relating to the present invention is extremely easy to install in a cell container since the dry-preservability as described above enables the work in a living area instead of in water, leading to an economic efficiency without the necessity of a working-pool-like facility, being excellent in hydrogen-ion permeability, and particularly useful with extremely low liquid permeability and excellent in durability compared to conventional products.

REFERENCE NUMERALS

1 Separation membrane for redox flow battery
2 Electrode
2a Positive electrode
2b Negative electrode
3 Frame
3a Positive electrode frame
3b Negative electrode frame
4 Bipolar frame
4a Positive electrode bipolar frame
4b Negative electrode bipolar frame
5 Cell
6 Cell stack
7 Suction/discharge
7a Positive electrolyte suction/discharge port
7b Negative electrolyte suction/discharge port
8 Suction/discharge port
8a Positive electrolyte suction/discharge port
8b Negative electrolyte suction/discharge port
9 Electrolyte tank
9a Positive electrolyte tank
9b Negative electrolyte tank
10a Positive electrolyte pump
10b Negative electrolyte pump
11 Immersion step
12 Drying step
13 Heat treatment step
14 Stirring and mixing step
15 Standing step
16 Stirring and mixing step
S Sheet substrate S1 Pre-treated sheet substrate
C1 Coating solution
C2 Coating diluent
R1 Mixed rosin
R2 Rosin solution

What is claimed is:

1. A separation membrane for a redox flow battery comprising:
   a protective film formed on each of both surfaces of a sheet substrate along with pores, the sheet substrate having thereon a number of pores communicating between the both surfaces; and
   an ion-exchange membrane adhered to the protective film, the ion-exchange membrane having a matrix formed of an ion-exchange resin dispersed therein with an inorganic porous powdery body attached with the ion-exchange resin obtained as a result of sulfonating rosin.

2. The separation membrane for the redox flow battery according to claim 1, wherein the rosin includes at least any one selected from the group consisting of gum rosin, tall rosin, wood rosin, polymerized rosin, disproportionated rosin, hydrogenated rosin, fortified rosin, rosin ester, and rosin metal salt.

3. The separation membrane for the redox flow battery according to claim 1, wherein the sheet substrate includes a polyester-spunbonded nonwoven fabric, and the protective film is made of an acrylic resin.

4. The separation membrane for the redox flow battery according to claim 1, wherein a resin of the matrix includes at least any one of lacquer and resins belonging to rosin combined with the ion-exchange resin.

5. The separation membrane for the redox flow battery according to claim 1, wherein the inorganic porous powdery body includes at least any one of diatomaceous earth, sepiolite, zeolite, perlite, calcium silicate, kaolin, attapulgite, vermiculite, cristobalite, and other porous silica bodies.

6. The separation membrane for the redox flow battery according to claim 1, wherein the ion-exchange resin or the ion-exchange membrane contains titanium oxide.

7. The separation membrane for the redox flow battery according to claim 1, wherein the ion-exchange resin or the ion-exchange membrane is added at least with any one of nitric acid, dilute nitric acid, and oxalic acid.

8. A method of manufacturing a separation membrane for a redox flow battery of claim 1, the method comprising the steps of:
   preparing a coating solution containing an inorganic porous powdery body and a sulfonating agent in a rosin solution obtained as a result of mixing a rosin and a solvent;
   forming a protective film on a sheet substrate having thereon a number of pores communicating between both surfaces thereof;
   applying the coating solution to the protective film; and
   drying the coating solution having been applied to the protective film, and thereafter heating the coating solution having been dried so that a sulfonic acid group is introduced into the rosin and thereby an ion-exchange resin is obtained,
   wherein an ion-exchange membrane is so formed as to have a matrix dispersed therein with the inorganic porous powdery body attached with the ion-exchange resin.

9. The method of manufacturing the separation membrane for the redox flow battery according to claim 8, wherein the rosin includes at least any one selected from the group consisting of gum rosin, tall rosin, wood rosin, polymerized rosin, disproportionated rosin, hydrogenated rosin, fortified rosin, rosin ester, and rosin metal salt.

10. The method of manufacturing the separation membrane for the redox flow battery according to claim 8, wherein the sheet substrate includes a polyester-spunbonded nonwoven fabric, and the method further comprises the steps of immersing the sheet substrate in a dilute solution of acrylic resin and drying the sheet substrate having been immersed in the dilute solution, and thereby a protective film made of an acrylic resin is formed.

11. The method of manufacturing the separation membrane for the redox flow battery according to claim 8, wherein a resin of the matrix includes at least any one of lacquer and resins belonging to rosin combined with the ion-exchange resin.

12. The method of manufacturing the separation membrane for the redox flow battery according to claim 8, wherein the inorganic porous powdery body includes at least any one of diatomaceous earth, sepiolite, zeolite, perlite, calcium silicate, kaolin, attapulgite, vermiculite, cristobalite, and other porous silicas.

13. The method of manufacturing the separation membrane for the redox flow battery according to claim 8, wherein the ion-exchange resin or the ion-exchange membrane contains titanium oxide.

14. The method of manufacturing the separation membrane for the redox flow battery according to claim 8, wherein the ion-exchange resin or the ion-exchange membrane is added at least with any one of nitric acid, dilute nitric acid, and oxalic acid.

* * * * *